Dec. 24, 1935.  C. L. MITCHEL ET AL  2,025,544
PROCESS OF CHEESE PACKING AND RESULTING PRODUCT
Filed Feb. 17, 1934
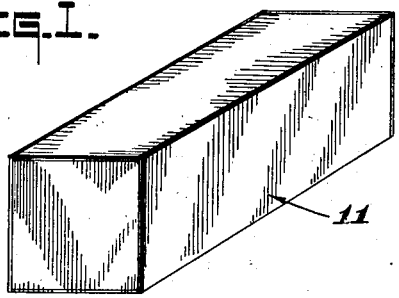
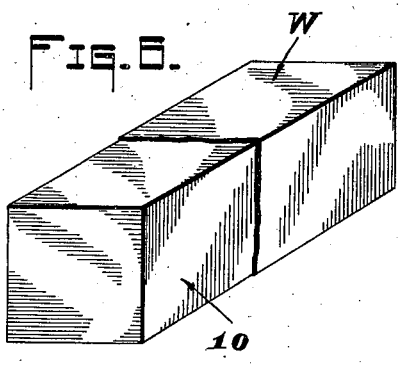
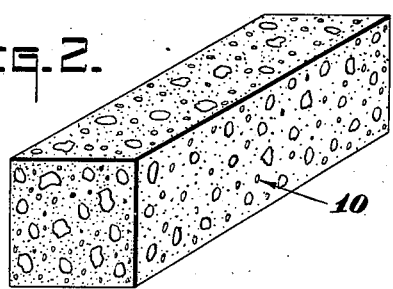
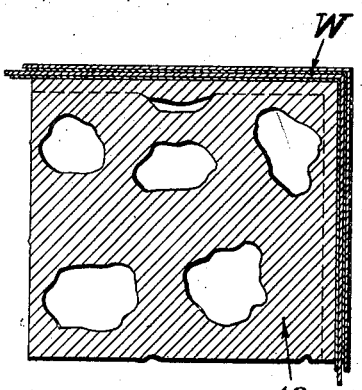
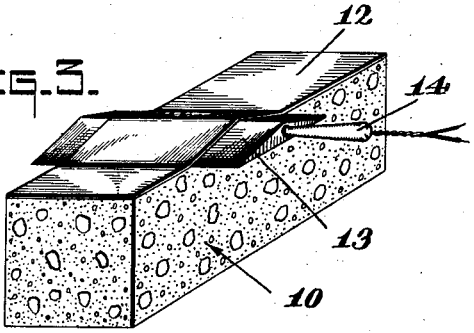
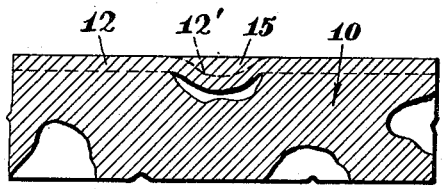
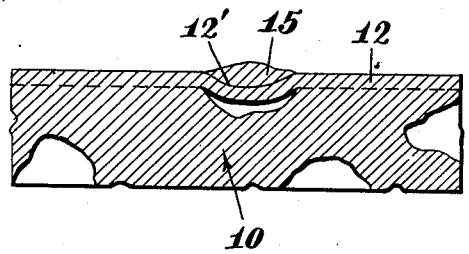
INVENTORS
C. L. MITCHEL
E. L. WETMORE
BY Hazard & Miller
ATTORNEYS Patented Dec. 24, 1935

2,025,544

UNITED STATES PATENT OFFICE 2,025,544

PROCESS OF CHEESE PACKING AND RESULTING PRODUCT

Clyde L. Mitchel, El Monte, and Elbert L. Wetmore, Alhambra, Calif., assignors to Challenge Cream and Butter Association, Los Angeles, Calif., a corporation of California Application February 17, 1934, Serial No. 711,754

10 Claims. (Cl. 99—11)

Our invention relates to the packaging of hard cheese and the resulting product.

Swiss cheese, both foreign and domestic, is manufactured in large forms, called "wheels" in the trade, in the shape of a thick disk, each wheel usually weighing about two hundred pounds. It is usually sold to retailers in large pieces in the shape of a sector of the disk, that is to say, the wheel is cut by making two cuts radially outwards from the center and from so-called "sandwich cuts" taken from the center of the cheese, leaving a number of undesirable portions spoken of as "butts". The retailing of Swiss cheese from such sectors is connected with considerable inconvenience and waste for the reason that it is difficult to cut slices of uniform thickness to advantage and the large exposed sides are subject to evaporation and mold, rendering the cut surfaces dry and unpalatable. It has been found impossible to manufacture Swiss cheese in smaller original packages than the large wheels above referred to without impairing the taste, flavor, and eye formation of the same.

It is an object of this invention to package Swiss cheese in the shape of convenient size bricks which are cut from the large wheels of Swiss cheese and protect the sides of the bricks by bonding therewith, through fusion of the surfaces in contact, a solid strip of Swiss cheese devoid of any eyes, to cover the eyes which may appear on the cut surface of the brick. It is possible, for the sake of giving the product a natural appearance, to leave a part of the rind on one side of each brick.

The strips of solid cheese, preferably made of the same kind of cheese as the brick itself, but previously processed and molded so as to form a solid mass of cheese devoid of any eyes, are firmly bonded with the body of the cheese of the brick. However, layers of other varieties of hard cheese, such as American, might be substituted. In addition, a protective wrapping is given to the brick of cheese so that in the retailing of the same slices may be easily cut of convenient size, thus minimizing or preventing any loss of the cheese.

The strips of solid cheese are united with the body of the brick by heating adjacent surfaces of the strips and the brick, respectively, so that the surface layers become melted or fused. The strip is then pressed against the brick, which causes the strip to form a homogeneous body with the brick, showing practically no line of demarkation of their union. By the application of heat another advantage is gained, namely, the sterilization of the surfaces thus fused together whereby the growth of molds or other micro-organisms is prevented.

With the above and other objects in view, which will appear as the description proceeds, our invention consists in the steps of the process and the resulting product hereinafter described and claimed.

In the accompanying drawing we have illustrated the various steps in applying the protective covering to the brick of Swiss cheese, and in which:

Fig. 1 shows a perspective view of a brick of processed or molded Swiss cheese from which strips are cut to be used to cover the sides of a brick of Swiss cheese which is shown in perspective in Fig. 2.

Fig. 3 shows a similar view to Fig. 2 and the application of a strip of cheese to the top side of the brick to be covered.

Fig. 4 is a cross sectional detail view of a brick of cheese to which the protective covering has been applied, showing the filling in of any recesses appearing in the covering.

Fig. 5 shows a similar view to Fig. 4 after heat has been applied to smooth and fill the recesses.

Fig. 6 is a perspective view of the finished brick of cheese, a portion of the protective covering having been removed.

Fig. 7 shows a cross sectional view of the finished brick of cheese showing the outer envelopes of tinfoil and parchment paper.

A brick is cut from a large wheel of Swiss cheese which may be of any convenient size, but a commercial size of 3½ x 3½ x 10½ inches has been found quite convenient. The same weighs about five pounds, and, as shown in Fig. 2, is indicated by the numeral 10. Cheese trimmings, usually taken from pieces that remain of the wheel after the bricks 10 have been cut therefrom, although other varieties may be substituted, are placed in a heater, preferably a water jacketed heater, and the temperature is raised to between 140° and 180° F. to melt the same. The molten mass is poured into molds of a shape similar to the brick of cheese 10, except that they are somewhat larger. The same is indicated by the numeral 11 in Fig. 1. The melting eliminates any of the eyes or holes present in the brick cheese. From the brick of cheese 11, which is solid and devoid of any eyes, slices or strips are cut to be used for covering the sides of the brick 10.

In Fig. 3 a strip of cheese cut from brick 11 is indicated at 12. The same is of a size to cover the top surface of the brick 10. Heat is applied to the adjacent surfaces of the strip 12 and the brick 10 to melt the surface layer thereof. A convenient method of applying the heat is by means of an electrically heated metal tool indicated at 13 and provided with a handle 14 which the operator passes between the adjacent faces as indicated in the drawing. The temperature of the tool 13 is about 500° F. and sufficient, by moving the same slowly from one end of the brick to the other, to cause the melting of the surface layers of cheese in contact therewith so that a moderate pressure on the strip 12, preferably made by passing a roller over it directly following the tool, is sufficient to bond the same firmly to the brick 10, and on cooling practically no line of demarkation can be distinguished between the strip 12 and the body of the brick 10. The process is repeated for each of the sides and ends of the brick until the same is completely encased by strips 12 on all sides thereof, except that where rind is left on one side no covering is required on that side.

As well known in the art, the flavor and texture of cheese that has been melted and cooled again is unfavorably affected or, at least, is distinctly different from the original unmelted cheese. By our method the flavor and texture of the body of the brick of Swiss cheese is preserved in its original condition except for the strips of cheese fused thereto and the surface layer of the brick which was fused to bond the strips firmly to the brick.

If there should be any especially large eyes or depressions in the sides of the brick 10, the strip 12, on cooling, will usually be depressed immediately above the eye. Such depression is indicated in Fig. 4 where the strip 12 shows a recess 12'. This is due to the fact that the heated tool 13 passing over the large eye will heat the air therein, which, on expanding, will escape, but on cooling, the decreased volume of the entrapped air in the eye will cause atmospheric pressure on the outer surface of the strip to indent and form a recess in the strip 12. Therefore, we prefer to fill these recesses by placing thereon small pieces of cheese taken from block 11 and indicated at 15. A heated element, which may be tool 13 or similar to a specially constructed flatiron with a flat surface, is then passed across the outer face of strip 12 which will melt and bond the piece 15 to the strip 12, and, at the same time, smooth out the outer surface of the strip 12 as indicated at Fig. 5.

The strip of cheese entirely encases the brick of cheese so that all their sides and ends are sealed to the access of air to the interior. The brick is now wrapped in metal foil coated on the side to be placed next to the cheese with edible casein which has been dissolved in water containing a small percentage of alkaline salt, such as trisodium phosphate. The coating of dissolved casein forms an adhesive bond of minute thickness but sufficient to hermetically seal the meal foil to the surface of the cheese, thereby preventing growth of mold. The same effect can be obtained by first dipping the cheese for a moment into an aqueous solution of trisodium phosphate, thus dissolving a minute portion of casein of the cheese, forming an adhesive which makes a seal between the metal foil and the surface of the cheese. The same method of wrapping cheese with metal foil is also applicable to the wrapping of cheese of other hard varieties, such as American and brick, when taken as green cheese to prevent growth of mold, evaporation of moisture, and development of rind.

The method of wrapping cheese with the casein-coated tin foil or wrapping cheese the casein on the surface of which has been, to a slight degree, dissolved by dipping the cheese into an alkaline solution and then applying metal foil thereto is of general application and forms the subject matter of our co-pending patent application for Packaging cheese and resulting product, Serial No. 712,158 filed February 20, 1934.

While our invention has been described in connection with Swiss cheese for which it is primarily intended, it will be obvious that it could be used in connection with any other hard cheese, and especially cheese which has normal pores or eyes or cracks therein. While it is preferred to use the strips 12 of the same kind of cheese, it will be obvious that strips of other kinds of cheese may be used, but ordinarily it will be preferred to have the very same kind of cheese as that of which the body of the brick itself is composed.

Various changes in the steps of the process may be made by those skilled in the art without departing from the spirit of our invention as claimed.

We claim:

1. The packaging of cheese comprising, cutting a brick of predetermined size from a larger body of hard cheese, covering the sides of the brick with strips of solid cheese devoid of any eyes, melting adjacent surfaces of the strips and the brick and pressing the strips onto the body of the brick to bond the strips firmly to the brick.

2. The packaging of cheese comprising, cutting a brick of predetermined size from a larger body of hard cheese, successively covering the sides of the brick with strips of solid cheese devoid of any eyes, applying heat to adjacent surfaces of each strip and the brick to melt the surface layers thereof, and pressing the strip onto the body of the brick to firmly bond the same.

3. The packaging of cheese comprising, cutting a brick of predetermined size from a larger body of hard cheese, successively covering the sides of the brick with strips made from melted hard cheese, applying heat to the adjacent faces of the strip and the brick to melt the surface layers thereof, and pressing the strip onto the body of the brick to firmly bond the same.

4. The packaging of cheese comprising, cutting a brick of predetermined size from a larger body of hard cheese, successively covering the sides of the brick with strips made from melted hard cheese, applying heat to the adjacent faces of the strip and the brick to melt the surface layers thereof, pressing the strip onto the body of the brick to firmly bond the same, applying pieces of solid cheese to any depressions on the outer faces of the strips, and smoothing the outer faces of the strips by applying heat thereto to melt the surface layers thereof.

5. The packaging of cheese comprising, cutting a brick of predetermined size from a larger body of hard cheese, covering the sides of the brick with strips of solid cheese devoid of any eyes, melting adjacent surfaces of the strips and the brick, pressing the strips onto the body of the brick to bond the strips firmly to the brick, and wrapping a casein coated tin-foil about the brick.

6. The packaging of cheese comprising, cutting a brick of predetermined size from a larger body of hard cheese, covering the sides of the brick with strips of solid cheese devoid of any eyes, melting adjacent surfaces of the strips and the brick, pressing the strips onto the body of the brick to bond the strips firmly to the brick, wrapping a casein coated tin-foil about the brick, and placing an air tight wrapping about the brick.

7. An article of manufacture comprising a brick of Swiss cheese containing eyes, encased by an envelope of assembled slices of hard cheese devoid of eyes, the adjacent faces of the brick and the slices being united by fusion, the body of the brick except where its surface layer is fused to the slices being in its original unmelted condition.

8. An article of manufacture comprising a brick of Swiss cheese containing eyes and having one of its faces the original rind, encased except for the rind face by an envelope of assembled slices of hard cheese devoid of eyes, the adjacent faces of the brick and the slices being united by fusion, the body of the brick except where its surface layer is fused to the slices being in its original unmelted condition.

9. An article of manufacture comprising a brick of Swiss cheese containing eyes, encased by an envelope of assembled slices of hard cheese devoid of eyes, the adjacent faces of the brick and the slices being united by fusion and the slices bridging eyes normally at the surface of the brick, the body of the brick except where its surface layer is fused to the slices being in its original unmelted condition.

10. An article of manufacture comprising a brick of Swiss cheese containing eyes, encased by an envelope of assembled slices of hard cheese devoid of eyes, the adjacent faces of the brick and the slices being united by fusion and the slices bridging eyes at the surface of the brick and presenting flat outer surfaces, the body of the brick except where its surface layer is fused to the slices being in its original unmelted condition.

C. L. MITCHEL.
E. L. WETMORE.